United States Patent [19]
Burakoff et al.

[11] Patent Number: 6,122,635
[45] Date of Patent: Sep. 19, 2000

[54] MAPPING COMPLIANCE INFORMATION INTO USEABLE FORMAT

[75] Inventors: Stephen V. Burakoff, Chestnut Hill; Sergiu S. Simmel, Brookline; Heath L. Watkin, Watertown; Robert A. Fein, Newton; Garett S. Wiley, Wellesley; Richard B. Amster, Brookline, all of Mass.

[73] Assignee: NewRiver Investor Communications, Inc., Andover, Mass.

[21] Appl. No.: 09/023,979

[22] Filed: Feb. 13, 1998

[51] Int. Cl.[7] .................................................. G06F 17/30
[52] U.S. Cl. .............................. 707/102; 707/104; 705/4
[58] Field of Search .................................. 705/36, 37, 4; 707/104, 9, 102

[56] References Cited

U.S. PATENT DOCUMENTS

| | | | |
|---|---|---|---|
| 5,270,922 | 12/1993 | Higgins | 364/408 |
| 5,502,637 | 3/1996 | Beaulieu et al. | 705/36 |
| 5,590,325 | 12/1996 | Kolton et al. | 707/104 |
| 5,689,650 | 11/1997 | McClelland et al. | 705/36 |
| 5,819,271 | 10/1998 | Mahoney et al. | 707/9 |
| 5,864,871 | 1/1999 | Kitain et al. | 707/104 |
| 5,893,079 | 4/1999 | Cwenar | 705/36 |
| 5,918,218 | 6/1999 | Harris et al. | 705/37 |
| 5,926,792 | 7/1999 | Koppes et al. | 705/4 |

FOREIGN PATENT DOCUMENTS

| | | |
|---|---|---|
| WO 96/18963 | 6/1996 | WIPO . |
| WO 97/15018 | 4/1997 | WIPO . |
| WO 98/33131 | 7/1998 | WIPO . |

OTHER PUBLICATIONS

PricewaterhouseCoopers Technology Centre, EdgarScan™. An Intelligent Interface to the SEC EDGAR Database, 1999 PricewaterhouseCoopers, 1 pg.

Edgarscan Beta Release (fwd), Sep. 8, 1996, 1 pg.

Patent Cooperation Treaty, International Search Report, International Application No. PCT/US 99/02487, mailed on Jul. 1, 1999, 7 pages.

PricewaterhouseCoopers Technology Centre, "A Technical Overview of the EdgarScan System," http://edgarscan.pwc-global.com/EdgarScan/edgarscan$_{13}$arch.html, 2 pgs.

"Global Securities Information Home Page,"http://www.g-sionline.com/, 10 pgs.

"LLRX—A Comparison of SEC Filing Sources," http://www.llrx.com/features/sec.htm/, May 22, 1997, 5 pgs.

"Electronic Data Gathering, Analysis, and Retrieval (EDGAR)—EDGAR Filer Manual: Guide for Electronic Filing with the U.S. Securities and Exchange Commission" by U.S. Securities and Exchange Commission, Washington, D.C., EDGAR Release 5.30, Aug. 1997.

"Filing EDGAR—A Reference Guide for EDGAR Filers" by RR Donnelley Financial, Jan. 1997.

"Registration of Mutual Funds—An Annotated Guide to Form N–1A, Related Releases and Relevant Provisions of the Federal Securities Laws" by RR Donnelley Financial, Mar. 1996.

"Investment Company Act of 1940 and Investment Advisers Act of 1940—Rules Thereunder Including Selected Provisional of Subchapter M of the Internal Revenue Code and Related Regulations" by RR Donnelley Financial, Jun. 1997.

InUnity Corporation Web Site (www.inunity.com), 19 pages printed on Jan. 21 1998.

(List continued on next page.)

*Primary Examiner*—Wayne Amsbury
*Attorney, Agent, or Firm*—Wolf, Greenfield & Sacks, P.C.

[57] ABSTRACT

A system for providing access to compliance information includes a subsystem for acquiring securities information from one or more database sources. The system extracts compliance information from the acquired securities information that is related to a particular security. The system also includes a subsystem for providing access to the computer-readable compliance information files over a computer communications link.

30 Claims, 7 Drawing Sheets

OTHER PUBLICATIONS

InUnity Corporation's Products and Services, 11 pages, Sep. 1997.

InUnity Corporation's Corporate Overview, 12 pages, May 1997.

"The Fund Profile—A White Paper" by Robert A. Fein of InUnity Corporation, 13 pages, Apr. 1997.

CUSIP Web Site (www.cusip.com), 13 pages printed on Feb. 7, 1998.

Ferguson D. "Parsing Financial Statements Efficiently and Accurately Using C and Prolog," *Proceedings of the Fifth International Conference on the Practical Application of Prolog, Proceedings FO PAP97.Practical Application of Prolog. Fifth International Conference,* London, UK, Apr. 22–24, 1997, pp. 157–167.

MAPPING COMPLIANCE INFORMATION INTO USEABLE FORMAT

TECHNICAL FIELD

This invention relates to manipulating disclosure information about securities stored in computer-readable form in the Securities and Exchange Commission's EDGAR database and/or one or more other repositories and, more particularly, to manipulating data contained in such securities submissions databases to extract only certain information such as a mutual fund prospectus.

BACKGROUND INFORMATION

Government agencies and securities exchanges require that certain information be made available to an investor before a security is sold, and that certain information be delivered to an investor with the confirmation of any transaction. This delivery of this information has historically taken place in person, or via document delivery services, such as the U.S. Mail, Federal Express, or United Parcel Service. Recently, government agencies and securities exchanges began allowing securities issuers and intermediaries to comply with information delivery requirements by delivering the information in an electronic format, for example by transmitting the information from one computer to another over a computer network.

Securities information is published in various electronic databases including the Securities and Exchange Commission's ("SEC") EDGAR database. EDGAR, the Electronic Data Gathering, Analysis, and Retrieval system, performs automated collection, validation, indexing, acceptance, and forwarding of submissions by companies and others that are required by law to file forms with the SEC. The primary purpose of EDGAR is to increase the efficiency and fairness of the securities market for the benefit of investors, corporations, and the economy by accelerating the receipt, acceptance, dissemination, and analysis of time-sensitive corporate information filed with the agency. EDGAR information is available on the internet at: http://www.sec.gov.

Although securities information is available from databases like EDGAR, the information is not readily available in a useful electronic format that enables compliance with government and securities exchange regulations, especially with regard to mutual funds and other non-corporate securities. EDGAR was designed in a manner that makes information regarding non-corporate securities difficult to find. EDGAR mutual fund information, for example, is listed as a submission of the corporate issuer, not the fund name that is marketed to the consumer, and may include information for more than one fund. EDGAR submissions also may include updates and amendments to earlier submitted information. It is quite possible for a single fund to have more than fifty amendments to its compliance information. An investor attempting to locate the complete compliance information for a fund directly from EDGAR would need to retrieve all applicable amendments. This is time-consuming, and it is difficult for the investor to know if all the amendments have actually been located and if the retrieved information about the fund is complete.

SUMMARY OF THE INVENTION

One aspect of the invention is a computer-assisted method for manipulating securities information. The method includes the steps of acquiring securities information from one or more database sources, identifying one or more portions of the acquired securities information as relating to a particular security, and creating a computer-readable file having the identified portions.

In one embodiment, access is provided to the computer-readable file over a computer communications link. In another embodiment, the acquiring step comprises acquiring the securities information from the EDGAR database of the Securities and Exchange Commission. In another embodiment, a file is created that contains a prospectus of the particular security. In another embodiment the method the identifying step includes matching a central index key to any of an internal identification number, a CUSIP number, or a stock exchange ticker symbol, and determining if the identification number, CUSIP number, or stock exchange ticker symbol relates to a particular security. In another embodiment, the identifying step includes identifying portions of the acquired securities information as compliance information, identifying the start and end of the compliance information, and extracting the compliance information from the securities information. In another embodiment, the identifying step includes identifying the effective date of the compliance information, identifying an amended compliance information item that the compliance information is amending and determining an effective date of the compliance information from the effective date of the amended compliance information item.

Another aspect of the invention is a system for providing access to compliance information. The system includes an obtainment subsystem. The obtainment subsystem acquires securities information from one or more database sources. The obtainment subsystem also extracts compliance information to create at least two computer-readable files. The computer-readable files have at least a portion of the compliance information relating to securities offered to investors by different sources. The system also includes an accessing subsystem that provides access to the computer-readable files over a computer communications link.

In one embodiment, the obtainment subsystem includes an acquisition subsystem for acquiring the securities information by accessing at least the EDGAR database to acquire EDGAR submissions containing securities information. The obtainment subsystem also includes a cataloging subsystem for locating the compliance information in the EDGAR submissions. The obtainment subsystem also includes a splitting subsystem for extracting the compliance information from the EDGAR submissions. In another embodiment, the system includes an effective date subsystem for identifying the effective date of the compliance information. In another embodiment, the system includes a quality assurance subsystem for reviewing the compliance information to assure its correctness.

As used herein, compliance information is a subset of securities information. Compliance information is certain information about a security that a government or a stock exchange requires be made available or delivered to an investor in that security. For example, the United States Securities and Exchange Commission ("SEC") and the National Association of Securities Dealers ("NASD") each require filing of certain information by an issuer of securities, this is an example of securities information. The SEC and NASD require that a certain subset of the securities information be made available to an investor in a security—this is compliance information, also referred to as regulated financial information documents ("RFID"). An example of compliance information is a mutual fund prospectus. The mutual fund prospectus could be located somewhere within an EDGAR filing that also contains other securities information, such as an amendment to a different prospectus, or a semi-annual report. Compliance information for a mutual fund can include, but is not limited to, prospectuses, supplements to prospectuses ("stickers"), statements of additional information ("SAI"), supplements to SAI's, annual reports, semi-annual reports. Certain sales and marketing information can also be considered compliance information since its distribution is also regulated by government agency and stock exchange rules. As another example, compliance information for a variable annuity fund includes the compliance information for the variable annuity fund, and the compliance information for each of the funds available for investment.

Another aspect of the invention is a computer-readable data storage device containing computer executable instructions. The computer-executable instructions are for execution on a computer and cause the computer to aid an operator in performing certain steps. The steps include identifying a subset of documents that were recently added to a document database and searching each of the subset of documents for desired information. Document identifiers are recorded for any of the subset of documents containing the desired information. The desired information is extracted the desired information from each of the subset of documents containing the desired information by (i) marking the lines of text in the document, (ii) identifying a start line and an end line of the desired information, and (iii) copying the desired information starting at the start line and ending at the end line. Finally, the extracted desired information is stored.

In one embodiment, the document database includes the EDGAR database. In another embodiment, the extracted desired information comprises an effective date. In another embodiment, the stored extracted desired information is stored on a file server. In another embodiment, the lines of text in the document are each marked with a unique number. In another embodiment, the start line and an end line of the desired information are identified at least two times independently.

Another aspect of the invention is a method for obtaining desired information from a document database. The method includes identifying a subset of documents that were recently added to the document database and searching each of the subset of documents for the desired information. The method also includes recording document identifiers for any of the subset of documents containing the desired information. The desired information is extracted from each of the documents containing the desired information by first marking the lines of text in the document, then identifying a start and end line marking at the start and end of the desired information, and then copying the desired information starting at the start line and ending at the end line. Finally, the extracted desired information is stored.

In one embodiment, the identifying step includes identifying the subset of documents that were recently added to the EDGAR database. In another embodiment, the step of extracting the desired information further comprises extracting a date that the desired information is effective. In another embodiment, the step of storing the information includes storing the extracted desired information and the effective date. In another embodiment, the step of storing the information further comprises storing the extracted desired information on a file server accessible via a computer communications link. In another embodiment, the sub-step of marking the lines of text in the document comprises numbering the lines of text in the document with a unique number. In another embodiment, the sub-step of identifying a start line and an end line of the desired information is accomplished at least two times independently.

Another aspect of the invention is a system for serving compliance information pages to a client. The system includes a computer-readable storage medium for storing compliance information of at least one particular security in electronic format. The system also includes an indexer for indexing the compliance information and producing an index page. The index page has identifiers for each item of compliance information for a particular security. The system also includes a network interface for transmitting the index page for display on a client.

In one embodiment, the compliance information comprises a mutual fund prospectus. In another embodiment, the indexing is based upon a unique identifier for each security.

Another aspect of the invention is a method for retrieving compliance information. The method includes receiving an identifier unique to a particular security, and transmitting compliance information for the security specified by the identifier.

In one embodiment, the identifier unique to a particular security is a CUSIP number. In another embodiment, the identifier unique to a particular security is a stock ticker symbol. In one embodiment, the compliance information is a mutual fund prospectus.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
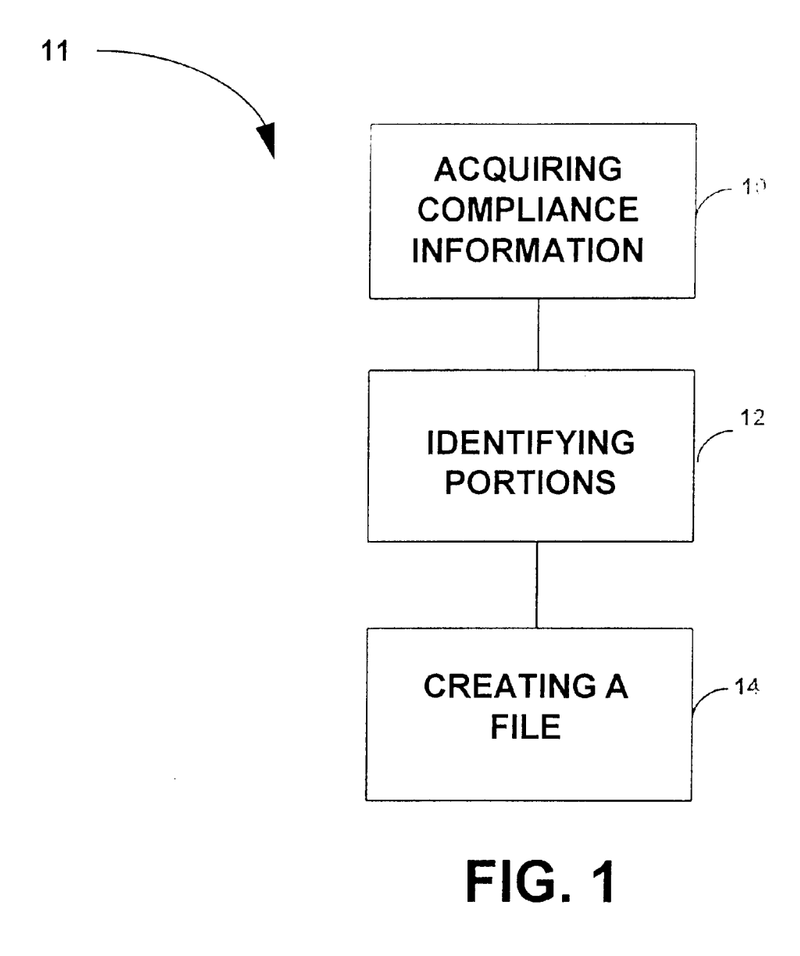
FIG. 1 is a flowchart of a method according to the present invention.

Referring to FIG. 1, a method of manipulating securities information comprises acquiring securities information from one or more database sources (Step 10). One or more portions of the acquired securities information is identified as related to a particular security, and extracted from the securities information (Step 12). A computer readable file is created that has the identified and extracted portions of the securities information (Step 14). This computer readable file, that has been identified as related to a particular security, is useful because it enables electronic transmittal of compliance information. Government and stock exchange regulations regarding the sale of securities by an issuer or intermediary to an investor mandate the availability and delivery of compliance information. Without the compliance information in electronic format, a seller would be required to make a physical copy of the information available to the buyer. This adds delay into the process of purchasing securities and can be expensive. By extracting compliance information so that it is available in electronic format, the present invention enables electronic securities transactions that could not otherwise take place. The compliance information can be delivered electronically, so that it can be available at all times, and delivered instantly.

Figure 2:
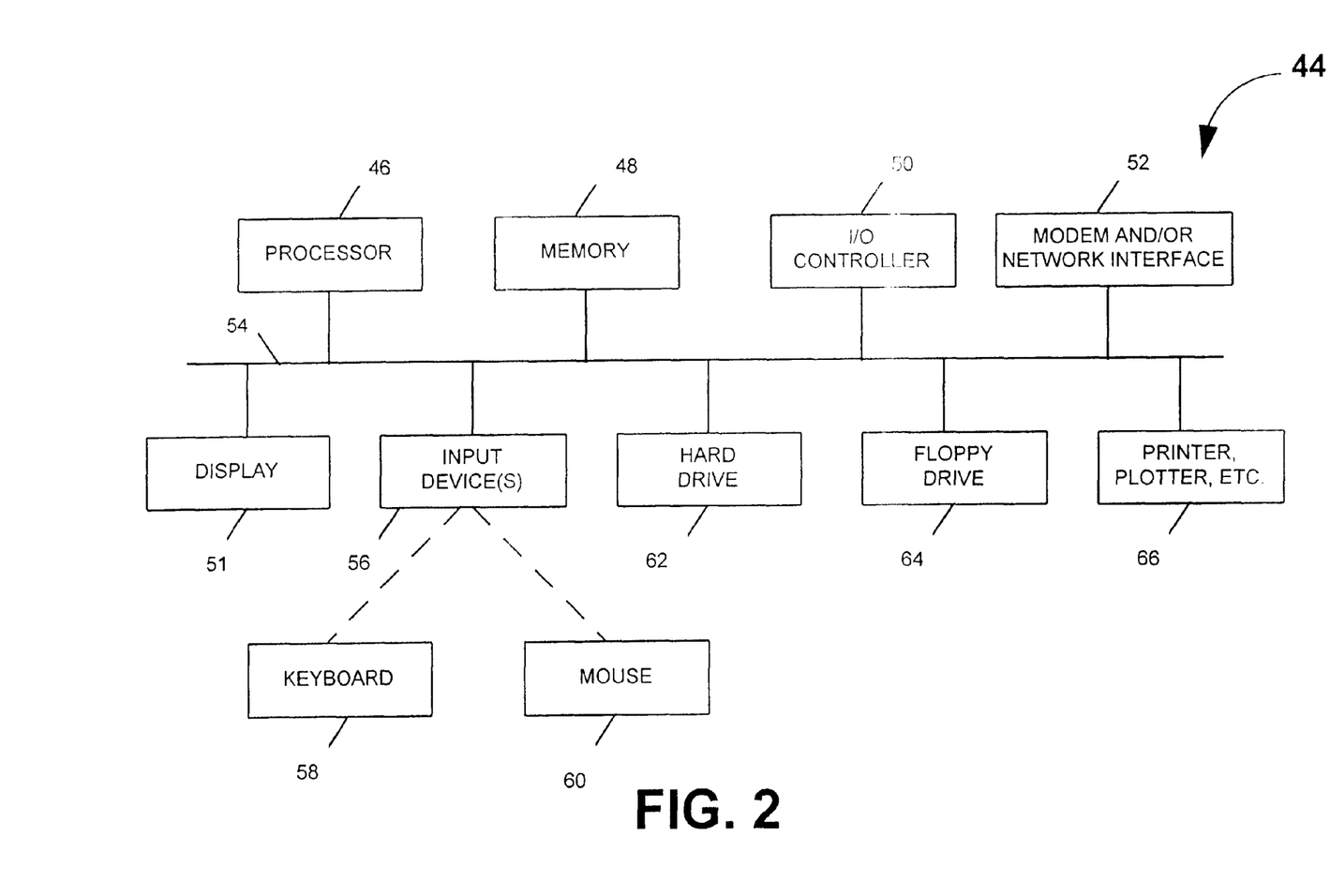
FIG. 2 is a block diagram of an embodiment of general purpose computer according to the present invention.

In the disclosed embodiment, the method 11 of FIG. 1 is accomplished by one or more persons operating a computer system programmed to assist in the execution of the method. A block diagram of such a computer system is shown in FIG. 2. The computer can be any computer or workstation such as a PC or PC-compatible machine, an Apple Macintosh, a Sun workstation, etc. The particular type of computer or workstation is not central to the invention. In fact, the invention can be implemented in a variety of ways including an all-hardware embodiment in which dedicated electronic circuits are designed to perform all of the functionality that the programmed computer can perform. One embodiment of the invention is an implementation in software for execution on a general purpose computer such as a PC running the Microsoft Windows or Microsoft Windows 95 operating system.

Referring to FIG. 2, the general purpose computer 44 typically will include a central processor 46, a main memory unit 48 for storing programs and/or data, an input/output (I/O) controller 50, a display device 51, and a data bus 54 coupling these components to allow communication there between. The memory 48 generally includes random access memory (RAM) and read only memory (ROM) chips. The computer 44 typically also has one or more input devices 56 such as a keyboard 58, and a mouse 60. The computer typically also has a hard drive 62 with hard disks therein and a floppy drive 64 for receiving floppy disks such as 3.5 inch disks. The computer typically has a data communications interface 52 to allow communication with other computers on an intranet or internet, such as a modem, an ethernet card, or other network interface. Other devices also can be part of the computer 44 including output devices 66 (e.g., printer or plotter) and/or optical disk drives for receiving and reading digital data on a CD-ROM. In the disclosed embodiment, one or more computer programs define the operational capabilities of the computer 44. These software programs can be loaded onto the hard drive 62 and/or into the memory 48 of the computer via the floppy drive 64 or the data communications interface 52.

Figure 3:
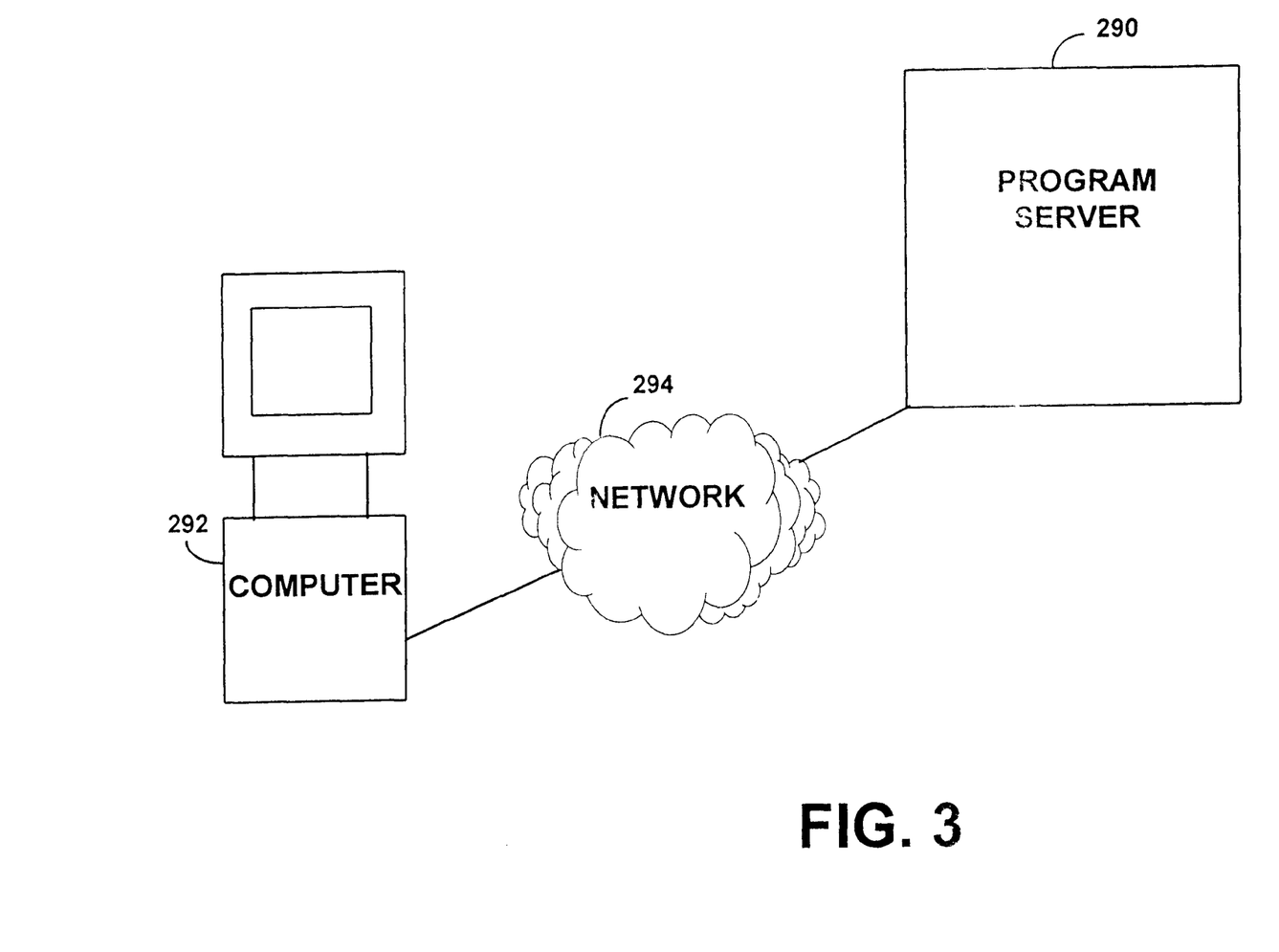
FIG. 3 is a block diagram of an embodiment of a computer and program server according to the present invention.

Referring to FIG. 3, the disclosed embodiment includes a computer 292 connected to a network 294 via a data communications interface 52. Computer programs that implement an embodiment of the invention are stored on a program server 290, which is another computer, that can be implemented as the type disclosed as general purpose computer 44. Generally a server has high performance components, such as a high speed processor 46 and hard drive 62, and a large amount of memory 48. The programs are stored on the server 290 in HTML and JAVA languages. The computer 292 runs commercially available world wide web browser software, such as Netscape Navigator or Microsoft Explorer. The browser software downloads the HTML and JAVA programs from the program server 290, and executes the programs. The programs communicate with the program server 290. The use of a network 294 and browser software makes the programs available to large number of computers on the network simultaneously. This facilitates operation of the system by multiple users at the same time.

Figure 4:
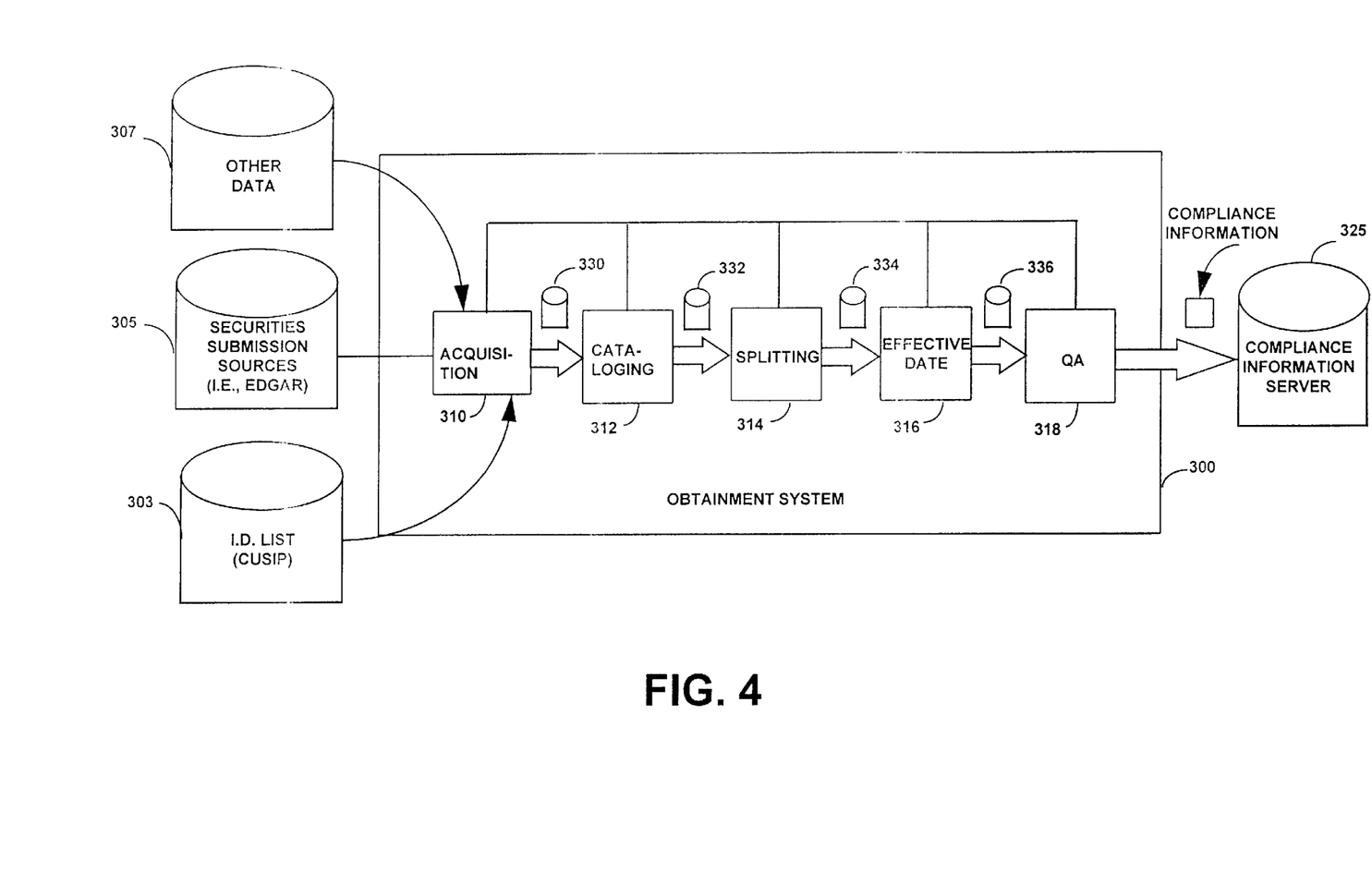
FIG. 4 is a block diagram of an embodiment of an obtainment system according to the present invention.

Referring to FIG. 4, the disclosed embodiment shows an obtainment system 300. Obtainment system 300 contains an acquisition subsystem 310, cataloging subsystem 312, splitting subsystem 314, effective date subsystem 316, and quality assurance subsystem 318. Obtainment system 300 takes as input identification list 303, securities submissions sources 305, and other data 307. As an output, obtainment subsystem 300 produces compliance information that can be delivered to a customer, or stored in a compliance information database 325.

The acquisition subsystem 310 has as its input the securities submission sources 305 and any other data 307. The output of the acquisition subsystem 310 is a cataloging queue. The securities information acquired by acquisition subsystem 310 are placed on the cataloging queue 330. Cataloging subsystem 312 takes the securities information from the cataloging queue 330 and catalogs it. The cataloging subsystem takes as its input the securities information from the cataloging queue 330, as well as identification list 303, and other data 307. After cataloging, the securities information is placed on the splitting queue 332. The splitting subsystem 314 takes the securities information from the splitting queue 332. After the splitting subsystem 314 determines the start and end points of each item of compliance information in an item of securities information, the securities information is placed on the effective date queue 334. The effective date subsystem 316 takes the securities information from the effective date queue 334, and determines the effective date for each item of compliance information in the securities information. The compliance information is then placed on the quality assurance queue 336. The quality assurance subsystem takes the securities information from the quality assurance queue 336. The compliance information is reviewed in the quality assurance subsystem 318, and then output from the system.

Referring to FIG. 3 and FIG. 4, a system operator uses the computer 292 executing a browser program to connect to program server 290. Upon connecting to the program server 290, the system operator chooses or is assigned a particular subsystem. The system operator chooses or is assigned items on the queue for that subsystem. The system operator uses the subsystem to process the data on the queue for that subsystem. By dividing the system into subsystems and queuing documents at each stage, the task of processing the documents is effectively divided up into many smaller tasks. Multiple system operators can simultaneously be assigned one of the smaller task, and can therefore process securities information simultaneously. For example, if there are four system operators, the first system operator can process a first securities information document in the cataloging subsystem, a second system operator can process a second securities information document in the cataloging subsystem, a third system operator can process a third securities information document in the splitting subsystem, and a fourth system operator can process a fourth securities information document in the QA subsystem. Using multiple system operators allows for rapid processing of many securities submissions through the system.

Acquisition subsystem 310 extracts files from the securities information source that contain securities information relevant to the subset of securities for which the user desires compliance information. In one embodiment, the securities submission source is first queried to extract all the files associated with a particular company. The company may be determined by its central index key, or by the company name. If this is not the first access for that company, the sources are compared to the information that is already in the database that is part of the system, so that the same document is not acquired twice. The subsystem thereby acquires submissions regarding securities that the user is interested in and that have not been previously processed. The acquiring subsystem passes the submissions to the cataloging subsystem 312.

In another embodiment, the acquisition subsystem 310 acquires documents automatically from EDGAR each day. EDGAR provides an index of the securities information added each day. The index lists a central index key associated with each item of securities information. Acquisition subsystem 310 uses the index to automatically acquire the most recent information for a specific list of central index keys. The list of central index keys is determined from a list of securities each having a unique identifier. For example, a list of securities identified by CUSIP number or stock ticker symbol can be mapped into a list of central index keys.

The cataloging subsystem 312 presents the system operator with the securities submissions that are relevant. The system operator inspects each submission and catalogs it according to the information contained within. The submission may contain several items of compliance information. The system operator identifies the particular securities about which the submission contains compliance information.

An internal identification number, CUSIP identifiers, and stock ticker symbols are used to identify a particular security. The internal identification number is unique for each security. A CUSIP number is a number assigned by Standard & Poor's CUSIP Service Bureau, the manager of the American Banking Association's CUSIP number system, to identify a security. A stock ticker symbol is a symbol assigned by a stock exchange to identify a security. An investor is likely to reference a security such as a mutual fund by the fund name marketed to the consumer, the CUSIP number, or the stock ticker symbol, not the investment company name or central index key.

For example, if securities information is acquired from the SEC EDGAR database, the submissions include company data, such as the company name, a central index key, an IRS number, an address, and if applicable, former company names. The company data indicates the source of the submission, but does not necessarily specify the securities described in the submission. A particular investment management find may have one to hundreds of funds, and information about all or some subset of those finds may be in one or more particular EDGAR submission.

In the disclosed embodiment of cataloging subsystem 312, a securities submission from the queue is presented to a system operator. The system operator is presented with a securities submission visible in one portion of the screen and cataloging information visible on another portion. Line numbers are assigned to each line of the submission. The submission is not permanently modified to include the line numbers, rather, the line numbers are shown only for the purpose of cataloging and extracting the compliance information. The cataloging portion of the screen presents a list of cataloging choices. Cataloging choices include possible CUSIP or stock ticker symbols, the type of compliance information contained in the document (for example prospectus, SAI, etc.), and the start line of each item of compliance information. As the system operator reviews the securities submission, the system operator selects the appropriate cataloging choices.

The splitting subsystem 314 determines the start and end of the compliance information that the system will use to extract compliance information from the securities submissions documents. For example, if the submission contains two SAI's, each for different securities, each of the two items of compliance information will be associated with their respective security. The splitting subsystem presents the system operator with the securities submission and the catalog data for that submission. The system operator verifies the start number and specifies the end number of each item of compliance information. When the start and end of all items of compliance information have been identified, the securities submission is then placed on the effective date queue. In one embodiment, the splitting subsystem 314 is accessed at least two times for each securities submission. The start and end numbers identified by the two system operators are compared in the quality assurance subsystem.

In one embodiment, the splitting subsystem 314 also determines whether the compliance information relates to, or is associated with more than one security. For example, for a bundled product such as a variable annuity fund, an EDGAR filing may be related to more than one investment product. One item of compliance information can be applicable to many products. This association determined in the splitting subsystem, is used later to associate the compliance information with the relevant securities. Alternatively, in other embodiments, this association occurs in the cataloging subsystem 312, or the effective date subsystem 316.

The effective date subsystem 316 supports the effective dating of the documents produced by the cataloging process. The system operator is presented with the file and must determine the effective date. If the system operator cannot determine the effective date, but the compliance information is a prospectus, and the system operator can determine the filing type, filing date and the prospectus date, then the system operator can determine the effective date through knowledge of applicable filing requirements and features built into the system, such as an automatic obsolescence feature that relates to the age of the document. After the effective date has been determined, the securities submission is placed on the quality assurance queue.

The effective date is determined based on the type of securities submission. For example, if the securities submission contains a 497 or 485BPOS filing, then the prospectus date is generally the effective date. If the document is a 485APOS filing, then the filing date is the "Filed As Of Date." The effective date is generally either the prospectus date or the filing date plus sixty days, whichever is later. If the prospectus registers a new series of stock, however, then the effective date is either the prospectus date or the filing date plus seventy-five days, whichever is later. If the prospectus date is incomplete, for example "January__, 1997," the operator can use his or her knowledge of applicable filing requirements to determine the effective date. For 497 and 485BPOS filings, the filing date is the effective date, and for 485APOS, the effective date is sixty days after the filing date, unless it is registering new shares, in which case the effective date is seventy-five days after the filing date.

In one embodiment, the effective date subsystem 316 also determines if the compliance information is amending another item of compliance information. If it is an amendment, the compliance information is effective when the compliance information it is amending is effective. The effective date system sets the effective lifespan, that is a date the compliance information is effective and a date that it is no longer effective, to that of the amended compliance information.

The quality assurance subsystem 318 is the final subsystem in the chain before the compliance information is output from the obtainment subsystem. The quality assurance subsystem 318 aids in the inspection of the compliance information. The system operator chooses or is assigned an item from the quality assurance queue. The system operator verifies that the securities submission has been processed by all subsystems. The system operator verifies that the catalog information is correct, and verifies the effective date, the document type, the issuer, the fund, the class, whether the document is complete, whether there is extra data, whether the document is properly formatted, as well as any other relevant information. In the embodiment in which the splitting subsystem 314 is accessed twice independently, the quality assurance system operator can compare the start and end lines specified by the two splitting subsystem 314 system operators for each item of compliance information. If any of the information is not complete, the system operator can place the document on any of the queues for processing by a subsystem. Once the system operator has verified that the compliance information will be extracted correctly, the extraction takes place and the compliance information is output from the obtainment system.

If, during processing by any of the subsystems, there is an error, for example if a securities submission does not contain necessary information, then the securities submission is placed on the error queue. A system operator can look at the securities submissions that have been placed on the error queue at a later time to solve the problems encountered.

Once output from the obtainment system, the compliance information can be stored in a file system on either computer 292 or program server 290. The compliance information can also be stored in a compliance information server 325. In one embodiment, the compliance information server 325 includes a document processor for converting the compliance information from its native format, for example ASCII text or HTML format, into another format, for example into Microsoft Word or Adobe Acrobat format. The compliance information is then stored in a different format than the securities information from which it was extracted.

In one embodiment, the compliance information server 325 is incorporated into the same machine as the obtainment system 300. In this case a system for providing access to compliance information would include obtainment system 300 and an accessing system that incorporated compliance information server 325. In another embodiment the compliance information server 325 is a separate server.

Figure 5:
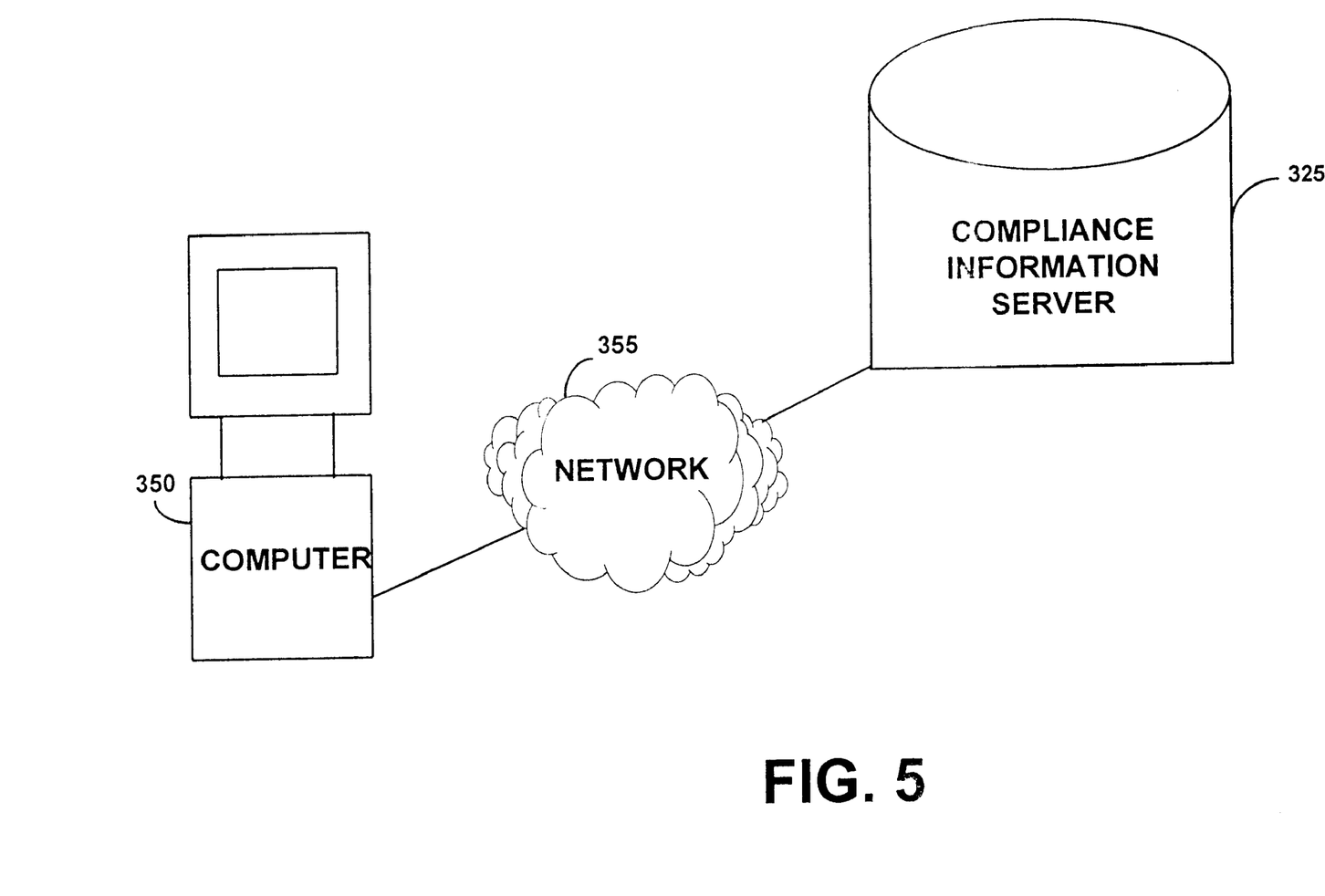
FIG. 5 is a block diagram of an embodiment of a client and a compliance information server according to the present invention.

Referring to FIG. 5, an embodiment of a compliance information server 325 is shown connected to network 355. A client 350 running browser software can access the compliance information server via the network to retrieve the compliance information. In one embodiment, the compliance information server makes the compliance information available over a network, such as an intranet or the internet. In another embodiment, the compliance information server 325 distributes the compliance information directly to a user or specified group of users via the network. In another embodiment, the compliance information server notifies users when new compliance information has become available at the server by sending a message over the network.

The compliance information server 325 has access to the compliance information as well as the catalog information about the particular security associated with the compliance information. It can therefore make the compliance information available in a manner that is useful. The information can be accessed in ways the securities information previously could not. For example, all of the compliance information for a particular security can be listed. Because the compliance information server has the information that was entered by the system operator when the document was processed by the cataloging subsystem, all the compliance information for a particular security can be accessed by the name of the security as it is marketed to the customer, the CUSIP number of the security, or the stock ticker symbol of the security.

Figure 6:
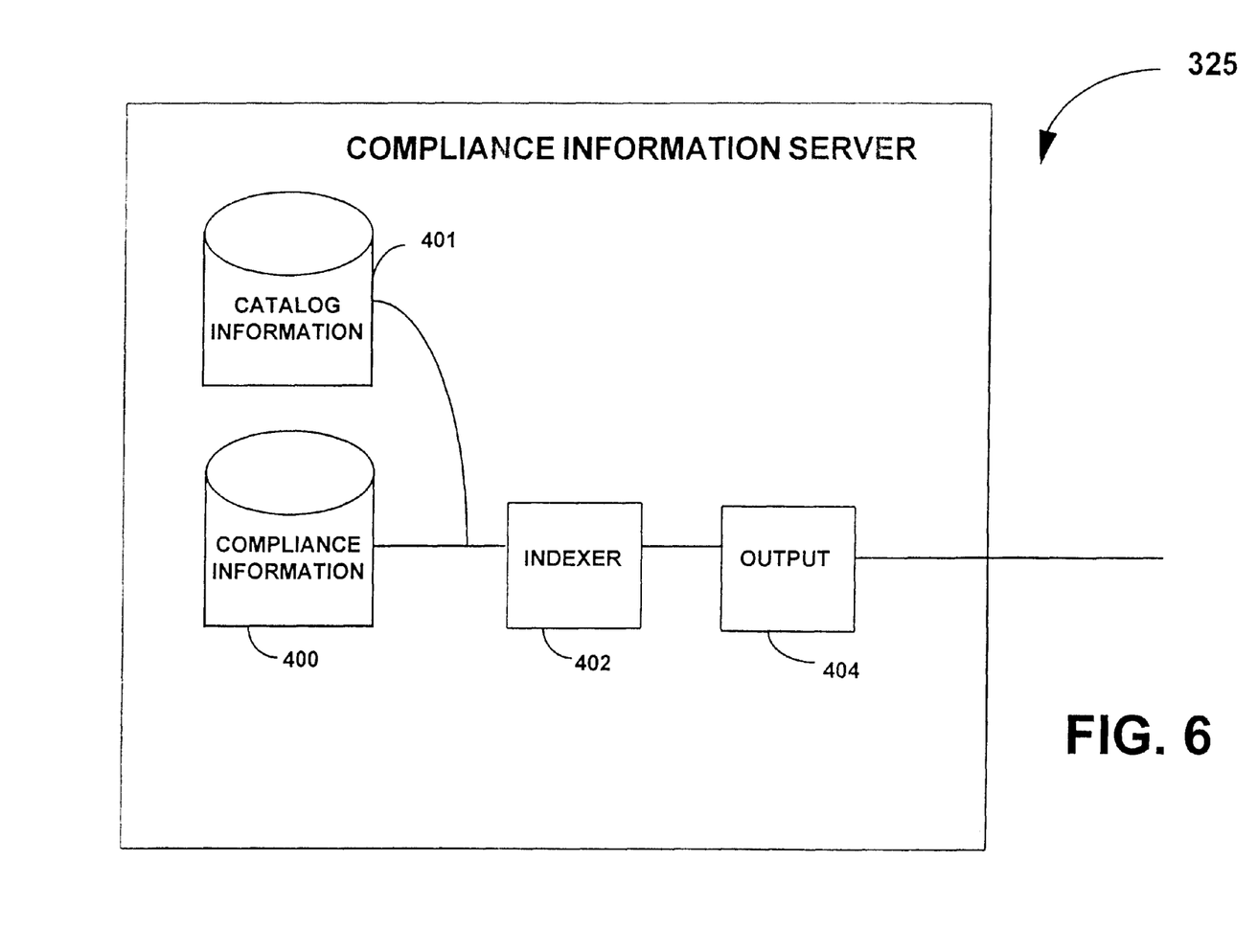
FIG. 6 is a block diagram of an embodiment of a compliance information server according to the present invention.

Referring to FIG. 6, the disclosed embodiment of a compliance information server includes compliance information, an indexer, and an output. The compliance information is stored on a hard disk 400, but it can also be stored on other media, in memory, or on another system that the compliance information server has access to over the network. The compliance information includes the compliance information produced by obtainment system 300. Compliance information server 325 also includes catalog information produced by system operators using obtainment system 300. An indexer 402 accesses the compliance information and the catalog information and identifies all compliance information associated with a particular security. Alternatively, indexer 402 does not use the catalog information 401, but instead searches each item of compliance information 400 to determine the particular security it is associated with. Indexer 402 may keep a list of the compliance information stored on hard disk 400 to increase the speed of production of a list of all compliance information associated with a particular security.

A request to compliance information server 325 may come in the form of a unique identifier for the security, such as an internal identifier, a CUSIP or a stock ticker symbol. The indexer identifies the compliance information associated with that unique identifier. The compliance information server can output a list of each of the compliance information documents that are available. Alternatively, it can output the compliance information. In one embodiment, the compliance information server receives a request for a list of all the information for a particular security. The request is in the form of a request for a web page. In response, the compliance information server 325 outputs a list of the compliance information. The list is in the form of a world wide web page that contains links to each of the items of compliance information. The world wide web page may also contain other information, including links to other information about that security.

Figure 7:
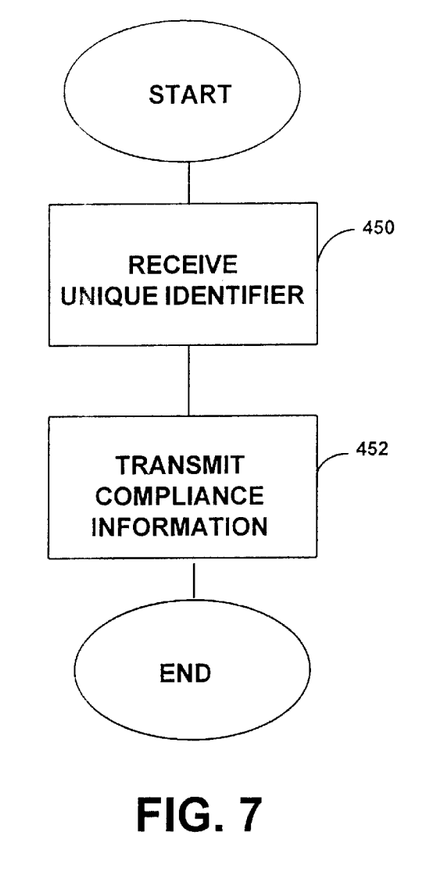
FIG. 7 is a flow chart of a method for responding to requests for compliance information according to the present invention.

Referring to FIG. 7, a method for responding to requests for compliance information includes receiving a unique identifier (step 450). The unique identifier can be a unique internal identifier, a CUSIP number, or a stock ticker symbol. The method also includes transmitting compliance information in response to the unique identifier (step 452). The compliance information server is capable of accomplishing the steps of the method because the compliance information server has the compliance information and it can associate the compliance information with the particular security specified by the unique identifier. In one embodiment, the compliance information is a prospectus for a mutual fund.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A computer-assisted method for manipulating securities information, comprising:

acquiring securities information from one or more database sources;

identifying at least one portion in each of at least two documents in the acquired securities information as compliance information for a particular mutual fund; and creating a computer-readable file from the identified portions wherein the computer-readable file comprises compliance information for the particular mutual fund.

2. The method of claim 1 further comprising providing access to the computer-readable file over a computer communications link.

3. The method of claim 1 wherein the acquiring step comprises acquiring the securities information from a database of EDGAR filings with the Securities and Exchange Commission.

4. The method of claim 1 wherein the creating step comprises creating a computer-readable file from the identified portions, wherein the computer-readable file comprises a prospectus of the particular mutual fund.

5. The method of claim 1 wherein the identifying step comprises matching a central index key to a CUSIP number associated with the mutual fund, wherein the central index key is provided by EDGAR.

6. The method of claim 5 wherein the identifying step further comprises, for each of the at least two documents:

identifying portions of the acquired securities information in the document as identified compliance information;

identifying the start and end of the identified compliance information in the document;

extracting the identified compliance information from the document.

7. The method of claim 6 wherein the identifying step further comprises:

identifying the effective date of the identified compliance information;

identifying an amended compliance information item that the identified compliance information is amending;

determining an effective date of the identified compliance information from the effective date of the amended compliance information.

8. The method of claim 1 wherein the creating step comprises creating a computer readable file from the identified portions wherein the computer-readable file comprises effective compliance information for the particular mutual fund.

9. A system for providing access to mutual fund compliance information, comprising:

an obtainment subsystem for acquiring securities information from one or more database sources and for extracting compliance information from at least two documents each comprising compliance information for a particular mutual fund; and an accessing subsystem for providing access to extracted compliance information for at least two mutual funds offered to investors by different fund issuers over a computer communications link.

10. The system of claim 9 wherein the obtainment subsystem comprises:

an acquisition subsystem for acquiring the securities information by accessing a database of EDGAR submissions containing the compliance information;

a cataloging subsystem for locating the compliance information in the EDGAR submissions; and a splitting subsystem for extracting the compliance information from the EDGAR submissions.

11. The system of claim 10 further comprising an effective date subsystem for identifying the effective date of the compliance information and a quality assurance subsystem for reviewing the compliance information to assure its correctness.

12. The system of claim 10 wherein the accessing subsystem comprises a document processor for converting the compliance information into another document format.

13. A computer-readable data storage device comprising computer executable instructions for execution on a computer to cause the computer to aid an operator in performing the steps of:

identifying a subset of filing documents that were recently added to a regulatory filing document database;

searching each of the subset of documents for compliance information;

recording document identifiers for any of the subset of documents containing the compliance information;

extracting the compliance information from each of the subset of documents containing the compliance information by (i) marking the lines of text in the document containing the compliance information, (ii) identifying a start line and an end line of the compliance information, and (iii) copying the compliance information starting at the start line and ending at the end line; and storing the extracted compliance information.

14. The computer-readable data storage device of claim 13 wherein the regulatory filing document database comprises the EDGAR database.

15. The computer-readable data storage device of claim 12 wherein the computer executable instructions further comprise the step of determining the effective date of the compliance information.

16. The computer-readable data storage device of claim 15 wherein the stored extracted compliance information is stored on a file server.

17. The computer-readable data storage device of claim 13 wherein the lines of text in the document are each marked with a unique number.

18. The computer-readable data storage device of claim 13 wherein the start line and an end line of the compliance information are identified at least two times independently.

19. A method for obtaining compliance information for a mutual fund from a regulatory filing document database, comprising:

identifying a subset of regulatory filing documents that were recently added to the regulatory filing document database;

searching each of the subset of documents for compliance information;

recording document identifiers for any of the subset of documents containing compliance information;

extracting compliance information from each of the documents containing the compliance information by (i) marking the lines of text in the document containing the compliance information, (ii) identifying a start and end line marking at the start and end of the compliance information, and (iii) copying the compliance information starting at the start line and ending at the end line; and storing the extracted compliance information for a particular mutual fund in a document.

20. The method of claim 19 wherein the identifying step comprises identifying the subset of documents that are recent EDGAR filings.

21. The method of claim 20 wherein the step of extracting the compliance information further comprises determining a date that the desired information is effective.

22. The method of claim 21 wherein the step of storing the information further comprises storing the extracted compliance information and the effective date.

23. The method of claim 19 wherein the step of storing the information further comprises storing the extracted compliance information on a file server accessible via a computer communications link.

24. The method of claim 19 wherein the sub-step (i) of marking the lines of text in the document comprises numbering the lines of text in the document with a unique number.

25. The method of claim 19 wherein the sub-step (ii) of identifying a start line and an end line of the compliance information is performed at least two times independently.

26. A system for serving compliance information pages to a client, comprising:

- a computer-readable storage medium for storing compliance information in electronic format of at least two mutual funds from different fund issuers;
- an indexer for indexing the compliance information and producing an index page comprising page identifiers for each item of compliance information for one of the mutual funds; and
- a network interface for transmitting the index page for display on a client.

27. The server of claim 26 wherein the compliance information comprises a mutual fund prospectus.

28. The server of claim 26 wherein the indexing is based upon a CUSIP number for each mutual fund.

29. A method for retrieving compliance information for a mutual fund, comprising:

- receiving a CUSIP number unique to a particular mutual fund;
- determining whether effective compliance information is available for the particular mutual fund;
- if effective compliance information is available, transmitting compliance information for the mutual fund specified by the identifier.

30. The method of claim 29 wherein the compliance information comprises a mutual fund prospectus.

* * * * *

(12) EX PARTE REEXAMINATION CERTIFICATE (9455th)
United States Patent
Burakoff et al.

(10) Number: US 6,122,635 C1
(45) Certificate Issued: Dec. 26, 2012

(54) MAPPING COMPLIANCE INFORMATION INTO USEABLE FORMAT

(75) Inventors: Stephen V. Burakoff, Chestnut Hill, MA (US); Sergiu S. Simmel, Brookline, MA (US); Heath L. Watkin, Watertown, MA (US); Robert A. Fein, Newton, MA (US); Garett S. Wiley, Wellesley, MA (US); Richard B. Amster, Brookline, MA (US)

(73) Assignee: Silicon Valley Bank, Santa Clara, CA (US)

Reexamination Request:
No. 90/008,973, Dec. 21, 2007

Reexamination Certificate for:
Patent No.: 6,122,635
Issued: Sep. 19, 2000
Appl. No.: 09/023,979
Filed: Feb. 13, 1998

(51) Int. Cl.
*B25J 9/16* (2006.01)
*G06F 17/30* (2006.01)

(52) U.S. Cl. .............. 705/4; 707/999.102; 707/999.104
(58) Field of Classification Search .................. None
See application file for complete search history.

(56) References Cited

To view the complete listing of prior art documents cited during the proceeding for Reexamination Control Number 90/008,973, please refer to the USPTO's public Patent Application Information Retrieval (PAIR) system under the Display References tab.

*Primary Examiner* — Scott L. Weaver (57) ABSTRACT

A system for providing access to compliance information includes a subsystem for acquiring securities information from one or more database sources. The system extracts compliance information from the acquired securities information that is related to a particular security. The system also includes a subsystem for providing access to the computer-readable compliance information files over a computer communications link.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5-7 and 13-25 is confirmed.

Claims 1-4, 8-12 and 26-30 are cancelled.

New claims 31-35 are added and determined to be patentable.

*31. The method of claim 19, wherein the compliance information is a subset of the securities information in the one or more database sources about the particular mutual fund which a government or exchange requires be made available or delivered to an investor in the particular mutual fund.*

*32. The method of claim 31, wherein the acquiring comprises acquiring from the one or more database sources at least some information which is not compliance information for the particular mutual fund.*

*33. The method of claim 1, wherein the identifying comprises:*

*receiving a unique identifier for the particular mutual fund;*

*mapping the unique identifier to a central index key;*

*using the central index key to access filings in a government regulatory database associated with the central index key; and*

*identifying one or more of the at least two documents as compliance information from among the filings identified using the central index key.*

*34. A method comprising an act of receiving compliance information extracted using the method of claim 19.*

*35. A system for serving compliance information pages to a client, comprising:*

*a computer-readable storage medium for storing compliance information in electronic format of at least two mutual funds from different fund issuers;*

*an indexer for indexing the compliance information and producing an index page comprising page identifiers for each item of compliance information for one of the mutual funds;*

*a network interface for transmitting the index page for display on a client;*

*further comprising at least one computer programmed to:*

*access securities information from one or more government regulatory database sources;*

*assist in identifying the compliance information for the at least two mutual funds from the securities information;*

*wherein the compliance information for each one of the at least two mutual funds comprises a subset of the securities information about the one of the at least two mutual funds which a government or exchange requires be made available or delivered to an investor in the one of the at least two mutual funds;*

*and further comprising a compliance information server that is programmed to:*

*receive a request that identifies a first mutual fund in a unique identifier and requests compliance information for the first mutual fund; and*

*respond to the request by returning the compliance information for the first mutual fund but not any securities information about the first mutual fund that is not identified as compliance information for the first mutual fund.*

\* \* \* \* \*